Oct. 15, 1968 R. E. SPIES 3,406,250

TELEVISION RECEIVER

Filed Dec. 20, 1965

Inventor
ROLF E. SPIES
BY
Mueller, Aichele & Rauner
ATTYS.

United States Patent Office 3,406,250
Patented Oct. 15, 1968

3,406,250
TELEVISION RECEIVER
Rolf E. Spies, Lyons, Ill., assignor to Motorola, Inc., Franklin Park, Ill., a corporation of Illinois
Filed Dec. 20, 1965, Ser. No. 514,969
5 Claims. (Cl. 178—5.4)

ABSTRACT OF THE DISCLOSURE

There is disclosed a burst controlled local oscillator for a color television receiver, wherein a coupling circuit having a transformer and parallel crystal for coupling the burst to the oscillator is tuned to a frequency different from the burst frequency providing the necessary passband for the burst and rejecting noise.

This invention relates to a system for generating a color reference signal for a color television receiver, and more particularly to a system for coupling the color burst signal to a color reference signal oscillator to control the frequency and phase thereof.

The composite color signal broadcast in accordance with NTSC color television standards includes recurring bursts of a color synchronizing signal. The color synchronizing signal consists of a selected number of cycles of a sine wave at the color subcarrier frequency (approximately 3.58 mc.) on the "back porch" of the horizontal synchronizing pulses, and is employed by the receiver to establish the correct phase of the locally generated color reference signal. Without the color synchronizing signal, the chrominance subcarrier demodulation process will not take place in the proper phase relationship, and the hue of the reproduced image will not correspond to that of the image as generated and transmitted.

The locally generated color frequency signal can be generated by a free running oscillator tuned to a frequency nominally equal to the color synchronizing signal frequency of 3.579545 megacycles. The color synchronizing burst signal is separated from the video signal and coupled to the color reference signal oscillator to lock this oscillator in synchronism with the color synchronizing signal.

A known type of burst synchronized oscillator circuit used in color television receivers is the injection-lock type of oscillator wherein the color synchronizing bursts are applied to an oscillator control electrode to phase synchronize the oscillations.

For stabilizing the oscillations a piezoelectric crystal may be used as part of the circuit to establish frequency stability and to reduce tendency to drift in frequency as may occur in corresponding circuits consisting of a tuning inductance and capacitor. The crystal is generally tuned to series resonance and it may oscillate together with a tank circuit at the reference frequency of 3.579545 megacycles. The synchronizing bursts passing through this circuit will be filtered to eliminate burst sidebands, but there may be insufficient filtering action to eliminate noise components which lie in the passband of the circuit and close to the burst frequency.

Such a circuit stabilized by an oscillating crystal usually requires means to neutralize the crystal shunt capacities due to the crystal holder and stray capacities. There are various known circuits for this but they utilize one or more inductors or capacitors, which are connected in series or parallel with the crystal. This circuitry thus needs additional elements so that the costs become higher and the circuit is more complicated.

Another presently used system for coupling the burst signal to the color reference signal oscillator includes a crystal filter series connected to couple the burst signal to the grid of a color reference signal oscillator tube. The crystal of such a filter is tuned to operate in the series resonance mode, and has to be neutralized also because the capacity of the crystal provides an undesired series path for spurious energy. Since it is difficult and costly to provide means for tuning the crystal, a precision crystal has to be used in order to insure the correct frequency. Also, the Q of the filter and the oscillator pull-in range must be controlled by means of external circuitry in order to match the source and load impedance to the point where the desired Q of the filter is obtained. The reference signal oscillator coupled to the crystal filter in most cases uses a separate oscillator the frequency of which is not controlled by the crystal but rather operates in a lattice filter mode. An additional impedance transforming network is usually necessary to couple this crystal tuned oscillator with its driver stage which generally represents a high impedance source.

It is an object of this invention to provide a color television receiver with an improved circuit for coupling a color synchronizing burst signal to a color reference signal oscillator.

Another object of this invention is to provide a color television receiver with a simple, inexpensive circuit by which the frequency of a color reference signal oscillator can be controlled.

Another object of this invention is to provide a color television receiver with an improved crystal frequency control circuit which can be tuned in a wide range to the frequency of the color reference signal.

Another object of this invention is to provide a color television receiver with a frequency control circuit for a color reference signal oscillator which minimizes the effect of noise coupled to the color reference signal oscillator with the color synchronizing burst.

A further object of this invention is to provide a color television receiver with a frequency control circuit for a color reference signal oscillator which minimizes the effect of temperature upon the oscillator circuit.

A feature of this invention is the provision of a color television receiver with a color reference oscillator having a transformer winding coupled in parallel with a crystal for coupling a synchronizing burst signal to the color reference signal oscillator, and tuned to effectively provide the required passband of the burst filter for rejecting noise and adjustment of the oscillator frequency over a wide range.

Further objects, features and advantages will be apparent from a consideration of the following description taken in connection with the accompanying drawings in which.

The present invention may be used advantageously in any color television system conforming to the NTSC compatible television standards for controlling the phase of a color reference signal which is generated in a color reference oscillator and synchronized by recurring burst signals. The input circuit of the oscillator includes a crystal operating in parallel therewith and coupled through a capacitor to the grid electrode of an oscillator tube. A pair of capacitors is connected between the grid electrode and a point of reference potential to effect a transformation of the relatively high impedance of the crystal to the relatively low impedance of the oscillator input and to provide a feedback path for the oscillator. A secondary winding of a burst coupling transformer connected in parallel with the crystal is tuned such that the crystal resonates in its parallel mode exactly at the frequency of the burst or synchronizing signal (3.58 mc.) and such that the secondary winding together with the crystal and the capacities in parallel therewith resonates at about 1 to 2.5 megacycles below the frequency of the synchronizing signal. The secondary winding of the burst transformer, which through the primary winding is coupled with the output circuit of the burst amplifier, thus not only couples the burst signals to the input circuit of the reference oscillator but also provides means to place the crystal precisely at 3.579545 megacycles. The passband skirt which coincides with the resonance curve of the crystal, contains a relatively small amount of the burst signal and, therefore, only a very small noise energy component. Since the Q of the crystal in its parallel resonant mode is very high, its bandpass is very narrow which enhances the relatively small burst signals.

Figures 1, 2:
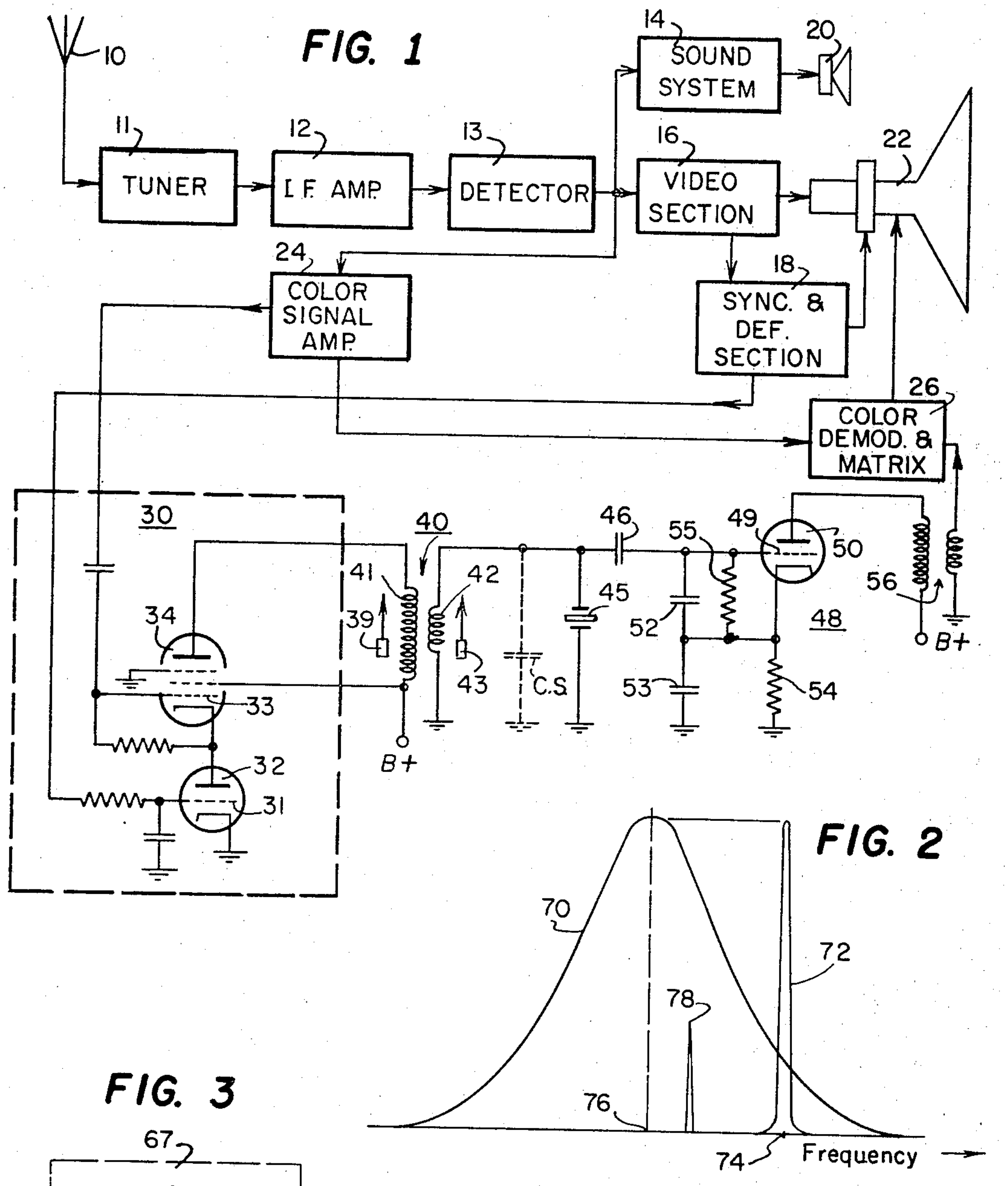
FIG. 1 illustrates a color television receiver circuit which utilizes one embodiment of the system for coupling a color burst signal to a color reference signal oscillator.
FIG. 2 is a curve illustrating the operation of the system.

Referring now to the drawings, in FIG. 1 there is illustrated a color television receiver incorporating the features of this invention. An antenna 10 receives the composite color television signal and couples it to tuner 11 which separates the desired television signal from other signals which may be present. The composite color signal is amplified in IF amplifier 12 and coupled to detector 13 and sound section 14, video section 16 and color signal amplifier 24. The output of sound section 14 is an audio signal which is coupled to speaker 20. The output of video section 16 is a video signal which is coupled to picture tube 22, which may be a tri-beam color tube or some other suitable color picture tube. The video signals developed in video section 16 are also coupled to synchronizing and deflection section 18, where the synchronizing signal is removed and deflection signals are generated. The deflection signals are coupled to picture tube 22 to sweep the electron beam therein. A gating pulse at the horizontal deflection frequency is also developed by synchronizing and deflection section 18, and coupled to grid 31 of tube 32 of the color synchronizing signal amplifier 30.

The gating pulse is present during the reception of the color synchronizing signal or burst so that burst amplifier 30 is turned on only when a color synchronizing signal is present. The chroma portion of the composite television signal and the color synchronizing signal are separated from the composite television signal in color signal amplifier 24. The chroma signal is applied to color demodulator and matrix 26 and the composite signal is applied to grid 33 of tube 34.

A color reference signal oscillator 48 is coupled to the burst amplifier 30 by transformer 40 having a primary 41 and a secondary 42 which can be tuned by means of cores 39 and 43 respectively. The input signal is coupled to grid 49 of oscillator tube 50 by capacitor 46. Oscillator 48 operates as a free running Colpitts oscillator having a nominal frequency of 3.579545 megacycles as controlled by crystal 45, which is a part of the oscillator circuit and coupled in parallel with the oscillator input. The phase of the color reference signal generated by color reference oscillator 48 is controlled by the burst signal applied to grid 49. The burst signal is coupled to the oscillator circuit by means of secondary winding 42 which, at the same time, provides a convenient means of tuning the crystal in connection with a temperature compensation of the transformation and feedback capacitors 46, 52 and 53. Resistor 55 is a grid leak resistor for developing the proper bias for grid 49 of tube 50. The output color reference signal from tube 50 is coupled to the color demodulation and matrix circuit 26 by transformer 56.

Figure 3:
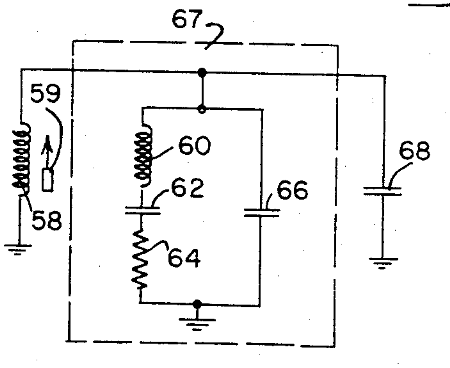
FIG. 3 illustrates an equivalent circuit of the embodiment shown in FIG. 1.

In order to permit inexpensive construction, the nominal frequency of crystal 45 is nearly, but not exactly, equal to 3.58 megacycles and thus it is necessary to provide means to alter the frequency to precisely the color reference frequency. How this is accomplished may be illustrated by reference to FIG. 3 where network 67 represents the equivalent circuit of crystal 45 wherein capacitor 66 is in parallel with the series combination of resistor 64, capacitor 62 and inductor 60. Inductor 58 corresponds to winding 42 in FIG. 1. The total external capacity across the crystal is represented by capacitor 68 which include the capacities of the crystal holder, capacitors 46, 52 and 53 and the inherent capacity across electron tube 50. Inductor 58 and capacitor 68 in combination either form a net inductance to lower the nominal frequency when it is greater than 3.58 megacycles or form a net capacitance to raise the nominal frequency when it is less than 3.58 megacycles. Net inductance or capacitance is simply and economically accomplished by varying the position of slug 59 (which corresponds to slug 43 in FIG. 1) in inductor 58.

In FIG. 2, curve 72 represents the high Q response of crystal 45 having a nominal resonant frequency 74 which is shifted by variation of the inductance of coil 58 either to the right or to the left depending on where 3.58 megacycles is located. Curve 70 represents the response of the entire circuit shown in FIG. 3. It is desirable that the resonant frequency 76 of the entire circuit be far below resonant frequency 74. Satisfactory results were obtained where frequency 76 was 1 to 2.5 megacycles below frequency 74. This relationship is essential to alleviate the effect that noise has on the frequency and phase of the oscillatory signal at the output of oscillator 48. Why this is true can best be explained by first assuming that the center frequency of curve 70 is 3.58 megacycles in which case a noise pulse 78 appearing at the output of burst amplifier 30 would ring the entire circuit at its resonant frequency to thereby cause energy to be present at 3.58 megacycles. This energy would be multiplied by the high Q of the crystal, thus presenting a large amplitude pulse at 3.58 megacycles to deteriorate operation of the oscillator and cause undesirable color streaking on the screen of cathode ray tube 22. However, if resonant frequency 76 of curve 70 is well below frequency 74 as shown, noise pulse 78 will still cause the circuit in FIG. 3 to ring at its resonant frequency which now is no longer 3.58 megacycles, but rather at a much lower value, namely frequency 76. Of course a certain amount of energy will be present at 3.58 megacycles due to ringing but the energy applied to oscillator 48 even though multiplied by the crystal Q, will be considerably less than if the resonant frequencies of the two curves coincided. Obviously, shifting the response causes a decrease in the amplitude of the burst signal conducted to oscillator 48 but from experiment, it was found that sufficient burst was present to provide several hundred cycles of pull in range.

The parallel combination of inductor 58 and capacitor 68 has a center frequency of 3.58 megacycles in order to provide inductance or capacitance, as the case may be, to place the crystal exactly at 3.58 megacycles. Since a crystal appears as a capacitor having a value approximately equal to its parallel capacitance, the combination of inductor 58, crystal 45 (equivalent circuit 67) and capacitor 68 as a resonant frequency below the crystal resonant frequency and by appropriately choosing the values of capacitor 46, capacitor 52 and capacitor 53 frequency 76 may be placed at any value, preferably at least 1 megacycle below frequency 74. When the inductance of coil 58 is varied not only does the crystal frequency shift above or below its nominal value, but also the center frequency of curve 70 shifts above or below frequency 76 since the resonant frequencies of both curves are dependent on the value of inductor 58. However, this does not adversely affect the circuit's operation because frequency 76 will only vary over a slight range and thus always remains well below 3.58 megacycles.

It is apparent that a significant advantage of connecting the crystal in parallel with the rest of the oscillator circuitry is that no neutralization is required because there is no path in the crystal for undesirable noise signals to pass to the oscillator. Also of advantage is the fact that an inexpensive crystal may be utilized because the nominal frequency can be varied over a few hundred cycles so that a high accuracy crystal is not required. A further advantage of the invention, is that the crystal response curve is on a portion of the overall response curve where the later is relatively flat so that negligible phase shift occurs as inductor 58 is tuned to place crystal 45 on frequency.

The pull-in range of the oscillator is determined by the mutual coupling between the burst injection coil 42 and the burst transformer primary 41. The value of resistor 54 which is coupled back to crystal 45 by capacitors 52 and 53 affects the Q of crystal 45 and thus also controls the pull-in range of reference oscillator 48. The ratio of the matching capacitors 52 and 53 also determines the amount of feedback and thus the oscillator amplitude. By using capacitors 46, 52 and 53 with a temperature coefficient which is opposite to the temperature coefficient of the coil 42 and the capacity across grid-cathode of the oscillator tube, the color reference signal oscillator can be made insensitive to temperature variations. This enables one to minimize the effect of capacity variation on the oscillator circuit. The capacities 46, 52 and 53 can be chosen in value over a wide range for better matching the Q of a particular crystal to the tube input.

What has been described is a circuit including a crystal for conducting the burst signal to the oscillator in a color television receiver which is relatively insensitive to undesirable noise signals and at the same time providing a convenient method for placing the crystal exactly on the desired frequency.

I claim:

1. A system for controlling a color reference signal in a color television receiver wherein a color image is reproduced in response to a received composite color television signal including recurring bursts of a color synchronizing signal, the automatic frequency control system including in combination, oscillator means having input circuit means, a crystal coupled in parallel with said input circuit means and operating at a resonant frequency corresponding to the frequency of the synchronizing signal, transformer means having a tuned winding coupled in parallel with said crystal, means coupling the bursts of the color synchronizing signal to said transformer means, said tuned winding providing a bandpass response, the center frequency of said bandpass response being different than said resonant frequency, said crystal and said tuned winding cooperating to cause said oscillator means to provide a color reference signal having a frequency substantially equal to the frequency of the color synchronizing signal.

2. The system of claim 1 in which said bandpass response of said tuned winding has its center frequency below said resonant frequency on the order of one megacycle or more.

3. The system of claim 1 including capacitor means coupled across said input circuit means, said capacitor means having a selected temperature coefficient to compensate inductance variations of said tuned winding with temperature.

4. The system of claim 1 further including a first capacitor coupling said tuned winding to said input circuit means and second and third capacitors series connected across said input circuit means, said capacitors having respective temperature coefficients to compensate inductance change of said tuned winding with change in temperature.

5. The system of claim 1 in which the difference between said resonant frequency and said center frequency of said bandpass being close enough to provide a sufficient amplitude of the color synchronizing signal to cause said oscillator means in cooperation with said crystal and said tuned winding to provide the color reference signal, but being sufficiently different to maintain said oscillator means substantially independent of undesired noise signal components.

No references cited.

ROBERT L. GRIFFIN, *Primary Examiner*.

R. MURRAY, *Assistant Examiner*.